(12) United States Patent
Bucher et al.

(10) Patent No.: US 10,851,849 B2
(45) Date of Patent: Dec. 1, 2020

(54) ENGINE ASSEMBLY

(71) Applicant: Mahle International GmbH, Stuttgart (DE)

(72) Inventors: Michael Bucher, Berlin (DE); Christoph Fiala, Potsdam (DE); Michael Hoetger, Berlin (DE); Hannes Marlok, Leonberg (DE); Lydia Ziegler, Berlin (DE)

(73) Assignee: Mahle International GmbH

( * ) Notice: Subject to any disclaimer, the term of this patent is extended or adjusted under 35 U.S.C. 154(b) by 285 days.

(21) Appl. No.: 15/946,700

(22) Filed: Apr. 5, 2018

(65) Prior Publication Data

US 2018/0291967 A1    Oct. 11, 2018

(30) Foreign Application Priority Data

Apr. 6, 2017 (DE) .................. 10 2017 205 913
Jan. 24, 2018 (DE) .................. 10 2018 201 110

(51) Int. Cl.
*F16D 25/0632* (2006.01)
*F02N 7/00* (2006.01)
(Continued)

(52) U.S. Cl.
CPC .......... *F16D 25/0632* (2013.01); *F02N 7/00* (2013.01); *F02N 15/08* (2013.01); *F16D 15/00* (2013.01);
(Continued)

(58) Field of Classification Search
CPC .... F16D 25/0632; F16D 15/00; F16D 25/085; F16D 25/087; F16D 28/00; F16D 41/04;
(Continued)

(56) References Cited

U.S. PATENT DOCUMENTS 8,857,181 B2   10/2014   Bartosch et al.
9,080,658 B2   7/2015    Eisenmenger et al.
(Continued)

FOREIGN PATENT DOCUMENTS

DE   102007006420 A1   8/2008
DE   10 2010 031 498 A1   1/2012
(Continued)

OTHER PUBLICATIONS

German search report dated Dec. 21, 2018.

Primary Examiner — Tinh Dang

(74) Attorney, Agent, or Firm — Fishman Stewart PLLC

(57) ABSTRACT

An engine assembly may include an internal combustion engine and an expander couplable to the internal combustion engine in a force transmitting manner. The engine assembly may also include a pulley mounted rotatably on a shaft of the expander. The pulley may be coupled to the internal combustion engine in a force-transmitting manner via a belt drive. The engine assembly may further include a first driver plate connected non-rotatably to the pulley and a second driver plate arranged adjacent thereto and connected non-rotatably to the shaft. The engine assembly may additionally include a clutch device including at least one actuating device and a coupling wheel. The coupling wheel may contact the first driver plate and the second driver plate when the clutch device is closed such that the pulley is connected with the shaft of the expander in a driving manner.

20 Claims, 2 Drawing Sheets

(51) Int. Cl.
*F02N 15/08* (2006.01)
*F16D 15/00* (2006.01)
*F16D 25/08* (2006.01)
*F16D 41/04* (2006.01)
*F02N 5/04* (2006.01)
*F02N 15/02* (2006.01)
*F16H 55/36* (2006.01)
*F16D 13/76* (2006.01)
*F02B 65/00* (2006.01)
*F16D 28/00* (2006.01)

(52) U.S. Cl.
CPC ......... *F16D 25/085* (2013.01); *F16D 25/087* (2013.01); *F16D 28/00* (2013.01); *F16D 41/04* (2013.01); *F02N 5/04* (2013.01); *F02N 15/022* (2013.01); *Y02T 10/166* (2013.01)

(58) Field of Classification Search
CPC ... F02N 7/00; F02N 15/08; F02N 5/04; F02N 15/002; Y02T 10/166
See application file for complete search history.

(56) References Cited

U.S. PATENT DOCUMENTS 9,360,061 B2  6/2016  Wiedmann et al.
9,970,329 B2  5/2018  Tanaka

FOREIGN PATENT DOCUMENTS

| DE | 10 2012 204 368 A1 | 9/2013 |
| DE | 112014004215 T5 | 5/2016 |
| WO | 00/31400 A2 | 6/2000 |

ENGINE ASSEMBLY

CROSS-REFERENCE TO RELATED APPLICATIONS

This application claims priority to German Patent Application No. DE 10 2018 201 110.9, filed on Jan. 24, 2018, and German Patent Application No. DE 10 2017 205 913.3, filed on Apr. 6, 2017, the contents of both of which are hereby incorporated by reference in their entirety.

TECHNICAL FIELD

The present invention relates to an engine assembly with an internal combustion engine and an expander which may be coupled thereto in force-transmitting manner. The invention further relates to a method for starting an expander by means of such an engine assembly.

BACKGROUND

In order to start an expander, for example an axial piston machine, such an expander often needs a starting impulse to begin rotating. This can be achieved by various methods, for example simply with an input of steam or coupling to an internal combustion engine, which should rotate during operation, and can also be brought into operative connection therewith when the mechanical work produced by the expander is input directly into a drivetrain.

An electromagnetic clutch for connecting an expander to an internal combustion engine, comprising a first shaft, which is drivable by the expander, and a second shaft, which is drivable by the internal combustion engine, is known from DE 10 2010 031 498 A1. In this context, an idler gear connected to the first shaft and a clutch bell housing connected to the second shaft are provided. In addition, a freewheel is provided between the idler gear and the clutch bell housing, which freewheel serves to transfer a rotary movement and enables the clutch bell housing to move freely relative to the idler gear. With the electromagnetic actuation, a friction force can also be generated between the idler gear and the clutch bell housing to entrain the expander, and thus start it, for example.

A species-related engine assembly is also known from DE 10 2012 204 368 B4 A, in which a mechanical clutch is actuated by a fluid, enabling a transfer of force between the internal combustion engine and the expander, and thereby generating the torque impulse needed to start the expander.

However, the engine assemblies known from the related art rely on a relatively complicated clutch device to start the expander.

SUMMARY

The present invention therefore addresses the problem of describing an improved or at least alternative embodiment of an engine assembly according to the species which is characterized particularly by a simple construction.

This problem is solved according to the invention by the objects of the independent claim(s). Advantageous variants are the object of the dependent claim(s).

The present invention is based on the general idea of using a clutch device of extremely simple construction with a coupling wheel to start an expander, a steam-driven axial piston machine, for example, wherein said coupling wheel, which may also have the form of a coupling roller for example, is brought into rotating contact with two driver plates with the clutch device closed, wherein one of the driver plates is connected non-rotatably to a pulley which is connected in driving manner to an internal combustion engine, while the other driver plate is coupled non-rotatably to a shaft of the expander. If the coupling wheel of the clutch device according to the invention is brought into simultaneous rotating contact with both driver plates, a turning moment is transmitted from the pulley driven by the internal combustion engine to the shaft of the expander via the two driver plates, thereby enabling the expander to be started. In this context, the engine assembly according to the invention includes an internal combustion engine and the expander which can be coupled therewith in force-transmitting manner. The aforementioned pulley is arranged on one shaft of the expander so as to be rotatable via a roller bearing, for example, that is to say by means of a freewheel, wherein the pulley is coupled to the internal combustion engine in force-transmitting manner via a belt drive. Also provided are a first driver plate connected non-rotatably to the pulley and an second driver plate which is arranged adjacent thereto and connected non-rotatably to the shaft. In a particular special case, the first driver plate may also form an integral part of the pulley and may simply be embodied as a kind of chamfer, for example, which forms a circumferential channel together with the second driver plate. The clutch device includes at least one actuating device and the aforementioned coupling wheel, which is brought into contact with both driver plates when the clutch device is closed, thereby connecting the pulley in driving manner with the shaft of the expander. On this point, it should be noted that when the clutch device is closed the coupling wheel does not have to establish a non-rotating connection between the two driver plates, it only has to be sufficient to transmit a starting rotary impulse to the expander, to enable the clutch device according to the invention also to allow a certain slippage between the two driver plates when the clutch device is closed. With the engine assembly according to the invention, however, it is relatively simple to generate the rotary impulse required to reliably start the expander, an axial piston machine, for example, via the coupling wheel which cooperates with both driver plates, with the result that a clutch device may be created which is not only constructed very simply but also extremely inexpensive.

In an advantageous further development of the solution according to the invention, the coupling wheel is mounted rotatable on a lever, one end of which is attached by an articulated joint and this pivotably to the expander. In this context, the closer the coupling wheel is to the articulated joint between the lever and the expander, and the farther the lever itself extends beyond this point, the greater the levering forces that can be exerted on the coupling wheel via the lever, so that the length of the lever and the arrangement of the coupling wheel may be selected according to the magnitude of the rotary impulse which has to be transmitted. At the same time, such a lever and coupling wheel are also extremely simple and thus also very inexpensive to manufacture.

In an advantageous further development of the solution according to the invention, the actuating device includes a spring mechanism, which biases the lever into a position which does not connect the coupling wheel and the driver plates, a neutral position, for example. The clutch device is thus only displaced into a closed position connecting the driving elements via the actuating device, whereas the spring mechanism according to the invention effects a neutral position. If the actuating device of the clutch device fails, therefore, coupling does not take place. Such a spring mechanism may have the form of a simple helical spring, for example, which may thus be produced inexpensively.

In an advantageous further development of the solution according to the invention, the actuating device includes a pressure box. Such a pressure box enables two positions, in particular a first position in the non-actuated state, in which the spring mechanism biases the coupling wheel into the position in which no torque is transmitted with the driver plates, and a second position, in which the pressure box displaces the coupling wheel into the position in which torque is transmitted. Pressure boxes are inexpensive, extremely simply constructed and highly reliably operating actuating devices. Pressure may be applied by a source of compressed air, oil pressure (from the internal combustion engine) present in the vehicle, or by the pressure of the working medium from a WHR circuit.

According to an advantageous further development, it may also be provided that the coupling wheel is adjustable radially with respect to the driver plates, for example directly via the actuating device in the form of a working cylinder or an electric actuator. This electric actuator may also act on the lever or actuate—that is to say shift—the coupling wheel directly.

In an advantageous further development of the solution according to the invention, the first and second driver plates are embodied as first and second conical pulleys, which together form an outwardly open circumferential channel. In this case, the outer circumference of the coupling wheel is preferably designed to complement the circumferential channel, and the clutch device is actuated, that is to say closed, said outer circumference runs in the circumferential channel. The design of the two driver plates a conical pulleys, each with a chamfer, also makes it possible to reduce material usage, which is particularly advantageous when installing the engine assembly according to the invention in a motor vehicle.

Alternatively, it is of course also conceivable that both driver plates have an outer circumferential surface and the coupling wheel is embodied as a roller. This also represents an inexpensive but extremely effectively and reliably functioning clutch device.

It is expedient if the coupling wheel is furnished with a coating to increase friction, particularly a rubber coating. In the case of two driver plates made from plastic or metal, such a rubber coating may transmit the requisite torque and it is also not only inexpensive but also highly beneficial in terms of weight.

The present invention is further based on the general idea for providing an improved method for starting an expander by means of an engine assembly as described in the preceding paragraphs, in which the clutch device is equipped with at least one actuating device and one coupling wheel, which is brought into contact with both driver plates to start the expander, thereby connecting the pulley to the shaft of the expander in driving manner. The method according to the invention thus provides an extremely simple and at the same time reliable method for starting the expander while an internal combustion engine is running, without the need for the engine to start up using only its working medium.

Further important features and advantages of the invention are described in the subordinate claims, the drawing and the associated description of the figures with reference to the drawing.

Of course, the features described in the preceding text and those which will be explained subsequently are usable not in the combinations described in each case, but also in other combinations or alone without departing from the scope of the present invention.

Preferred embodiments of the invention are represented in the drawing and will be explained in greater detail in the following description, wherein the same reference numerals refer to identical or similar or functionally equivalent components.

BRIEF DESCRIPTION OF THE DRAWINGS

In the drawings, which are all schematic.

DETAILED DESCRIPTION

Figure 1:
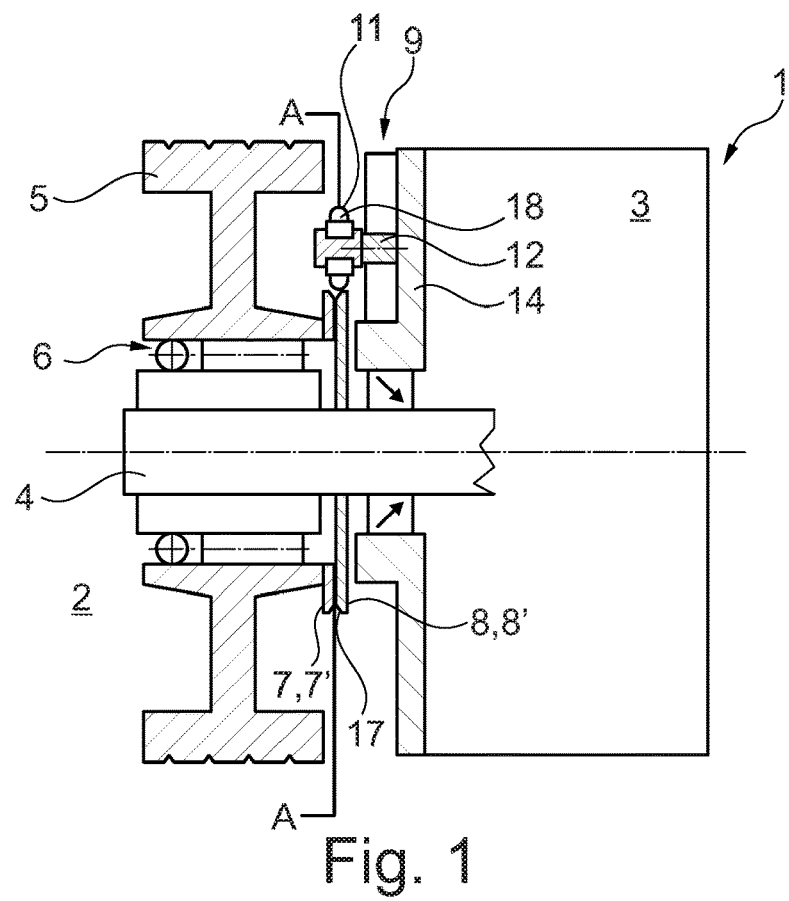
FIG. 1 represents an engine assembly according to the invention and a detailed illustration of a clutch device.

According to FIG. 1, an engine assembly 1 according to the invention includes an internal combustion engine 2—not shown in more detail—and an expander 3 which may be coupled for the transmission of force, wherein expander 3 may be embodied as an axial piston machine for example. A pulley 5 is mounted on a shaft 4 of expander 3 so as to be rotatable, for example via a roller bearing 6, that is to say a freewheel. Pulley 5 is coupled to internal combustion engine 2 in force transmitting manner via a belt drive—not shown. The belt drive runs over an outer surface of pulley 5. A first driver plate 7 which is connected non-rotatably to pulley 5 and a second driver plate 8 arranged axially adjacent thereto and connected non-rotatably to shaft 4 are also provided.

In such case, a clutch device 9 is equipped with an actuating device 10 and a coupling wheel 11 (see also FIG. 2), which enters into contact with both driver plates 7, 8 when clutch device 9 is closed, thereby connecting pulley 5 to shaft 4 of the expander 3 in driving manner.

Figure 2:
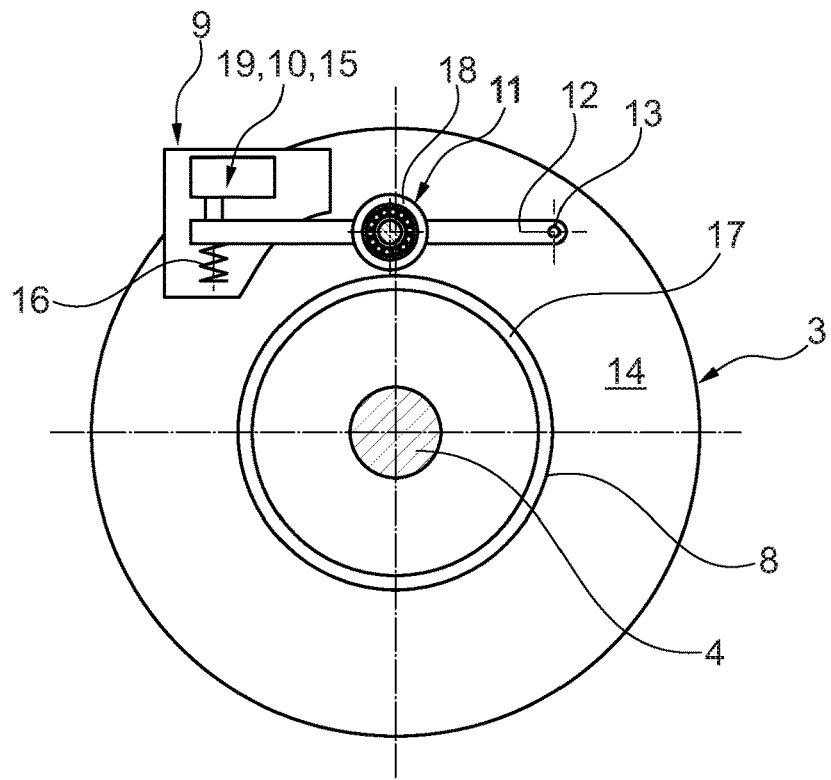
FIG. 2 is a representation of a cross-section along sectional plane A-A in FIG. 1.

Coupling wheel 11 is arranged rotatably on a lever 12, one end of which is attached in articulated manner and thus pivotably to expander 3, wherein lever 12 as shown in FIG. 2 is mounted rotatably on expander 3 at a fulcrum 13, particularly on a housing 14 thereof. Actuating device 10 is arranged on the opposite end of lever 12, while coupling wheel 11 is arranged approximately in the middle of lever 12. Levering forces of different magnitudes may be exerted on coupling wheel 11 via actuating device 10 depending on the arrangement of coupling wheel 11. Actuating device 10 may include for example a pressure box 15 or an electric actuator 19 or it may be constructed as such. Pressure box 15 or actuator 19 is arranged in such manner that in the actuated state it displaces lever 12 against a spring mechanism 16. Spring mechanism 16 is a component of actuating device 10 and biases lever 12 into a position which does not connect the coupling wheel 11 with the driver plates 7, 8.

Figure 3:
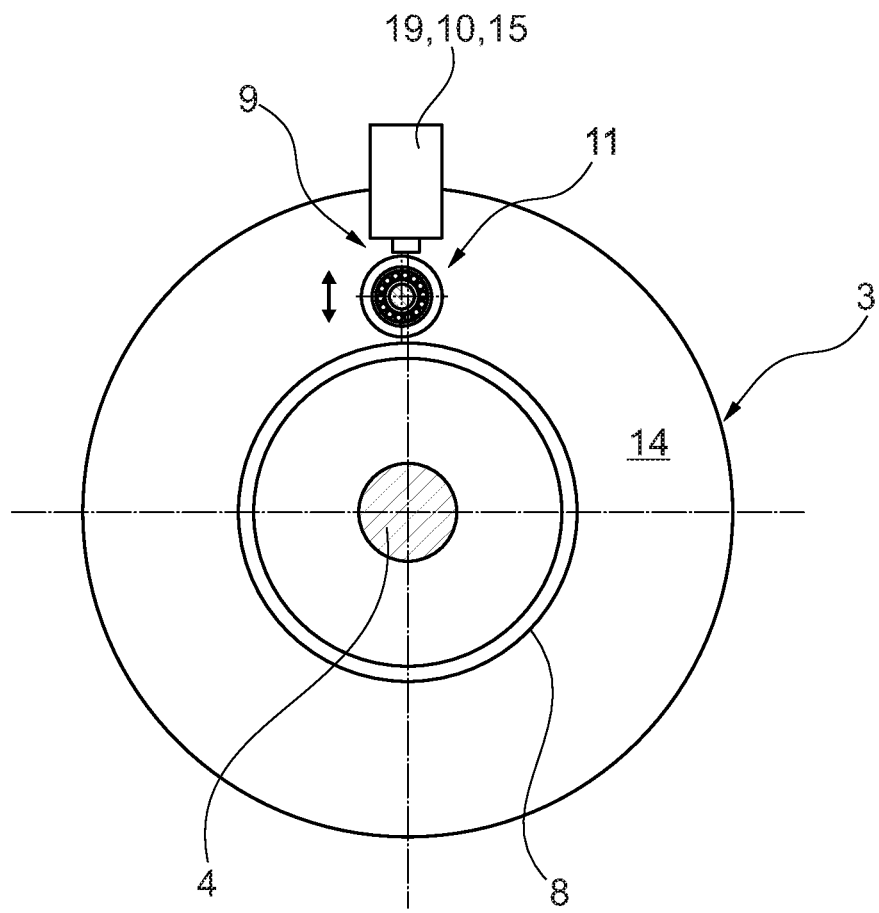
FIG. 3 is a representation of a cross-section along sectional plane A-A, but in another variant without a lever and with an electric actuator.

Alternatively, it may also be provided that coupling wheel 11 is displaceable radially with respect to driver plates 7, 8, direct by means of actuating device 10 in the form of a working cylinder, for example. For this purpose, actuating device 10 may include an electric actuator 19, for example. This electric actuator 19 may also act on lever 12 (see FIG. 2) or actuate—in other words displace—coupling wheel 11 directly, as represented in FIG. 3. In this case, coupling wheel 11 would be displaceable vertically according to FIG. 3. This would also enable a complex levering geometry to be dispensed with, for example.

First and second driver plates 7, 8 may also be embodied as first and second conical pulleys 7', 8', which together form an outwardly open circumferential channel 17. In this case, the outer circumference of coupling wheel 11 is preferably designed to complement the contour of circumferential channel 17. In order to be able to transmit the torque from pulley 5 to the shaft 4 of expander 3 and thus also transmit a starting torque impulse as reliably as possible, coupling wheel 11 may be furnished with a coating 18 to increase friction, particularly a rubber coating. In a particular special case, the first driver plate 7 may also form an integral part of pulley 5 and may simply have the form of a chamfer which forms circumferential channel 17 with the second conical pulley 8'.

The method for starting expander 3 by means of the engine assembly 1 according to FIGS. 1 and 2 is executed as follows: First, compressed air is activated, and consequently pressure box 15 forces lever 12 downwards according to FIGS. 1 and 2 against the spring force of spring mechanism 16. As soon as coupling wheel 11 rolls over both driver plate 7 and driver plate 8, clutch device 9 is closed, so that a torque may be transmitted from the rotating pulley 5 and the first driver plate 7 or the first conical pulley 7' connected non-rotatably therewith to the second driver plate 8 or the second conical pulley 8' and thus also to the shaft 4 of expander 3. This starts expander 4. After it is started, the compressed air is deactivated, which in turn depressurises pressure box 15 of actuating device 10, which allows spring mechanism 16 to push lever 12 upwards about fulcrum 13, thereby releasing coupling wheel 11 from rotating contact with the two driver plates 7, 8. Clutch device 9 is then open again.

In a particularly advantageous variant of first driver plate 7, said plate forms an integral part of pulley 5 and may thus be manufactured as single part therewith. This reduces the number of parts and also the warehousing and logistical costs associated therewith.

The engine assembly 1 according to the invention and the method according to the invention serve to ensure reliable starting of an expander 3 by the simplest and most inexpensive structural means possible.

The invention claimed is:

1. An engine assembly, comprising:
an internal combustion engine;
an expander couplable to the internal combustion engine in a force transmitting manner;
a pulley mounted rotatably on a shaft of the expander, the pulley coupled to the internal combustion engine in a force-transmitting manner via a belt drive;
a first driver plate connected non-rotatably to the pulley and a second driver plate arranged adjacent thereto and connected non-rotatably to the shaft; and
a clutch device including an actuating device and a displaceable coupling wheel;
wherein the coupling wheel is disposed in contact with the first driver plate and the second driver plate when the clutch device is closed such that the pulley is connected with the shaft of the expander in a driving manner; and
wherein the coupling wheel is disposed spaced apart from and does not contact the first driver plate nor the second driver plate when the clutch device is open.

2. The engine assembly according to claim 1, wherein the coupling wheel is arranged rotatably on a lever having an end attached in an articulated manner to the expander such that the lever is pivotable.

3. The engine assembly according to claim 2, wherein the actuating device includes a spring mechanism configured to bias the lever into a position where the coupling wheel does not contact the first driver plate and the second driver plate.

4. The engine assembly according to claim 1, wherein the actuating device includes a pressure box.

5. The engine assembly according to claim 3, wherein the actuating device further includes a pressure box arranged such that the pressure box displaces the lever against the spring mechanism when in an actuated state.

6. The engine assembly according to claim 1, wherein the first driver plate and the second driver plate are a first conical pulley and a second conical pulley, respectively, which together define an outwardly open circumferential channel.

7. The engine assembly according to claim 6, wherein an outer circumference of the coupling wheel is structured complementary to the circumferential channel.

8. The engine assembly according to claim 1, wherein the coupling wheel is displaceable radially relative to the first driver plate and the second driver plate.

9. The engine assembly according to claim 1, wherein, when the clutch device is open, the coupling wheel is disposed radially spaced apart from and axially between the first driver plate and the second driver plate relative to the shaft.

10. A method for starting an expander via an engine assembly, comprising:
rotatably mounting a pulley on a shaft of an expander, the pulley including a first driver plate non-rotatably connected thereto, the shaft including a second driver plate non-rotatably connected thereto and arranged adjacent the first driver plate;
coupling the pulley in a force-transmitting manner to an internal combustion engine via a belt drive; and
adjusting a coupling wheel of a clutch device into contact with the first driver plate and the second driver plate such that the pulley connects with the shaft of the expander in a driving manner.

11. The method according to claim 10, wherein adjusting the coupling wheel into contact with the first driver plate and the second drive plate includes engaging the coupling wheel in an outwardly open circumferential channel defined between a portion of the first driver plate and a portion of the second driver plate.

12. The method according to claim 10, wherein:
the coupling wheel is arranged rotatably on a lever having an end attached in an articulated manner to the expander; and
adjusting the coupling wheel into contact with the first driver plate and the second drive plate includes pivoting the coupling wheel about the end of the lever attached to the expander.

13. The method according to claim 10, wherein adjusting the coupling wheel into contact with the first driver plate and the second drive plate includes displacing the coupling wheel radially relative to the first driver plate and the second driver plate.

14. An engine assembly, comprising:
an internal combustion engine;
an expander couplable to the internal combustion engine in a force transmitting manner;

a pulley mounted rotatably on a shaft of the expander, the pulley coupled to the internal combustion engine in a force-transmitting manner via a belt drive;

a first driver plate connected non-rotatably to the pulley and a second driver plate arranged adjacent thereto and connected non-rotatably to the shaft; and a clutch device including at least one actuating device and a coupling wheel, the coupling wheel contacting the first driver plate and the second driver plate when the clutch device is closed such that the pulley is connected with the shaft of the expander in a driving manner, the coupling wheel including a coating facilitating friction between the coupling wheel and the first driver plate and the second driver plate;

wherein the first driver plate is a first conical pulley and the second driver plate is a second conical pulley, the first conical pulley and the second conical pulley defining an outwardly open circumferential channel.

15. The engine assembly according to claim 14, wherein the coupling wheel is displaceable radially relative to the first driver plate and the second driver plate.

16. The engine assembly according to claim 14, wherein:
the coupling wheel is arranged rotatably on a lever having an end attached in an articulated manner to the expander such that the lever is pivotable; and
the at least one actuating device includes a spring mechanism configured to bias the lever into a position where the coupling wheel does not contact the first driver plate and the second driver plate.

17. The engine assembly according to claim 14, wherein the at least one actuating device includes a pressure box.

18. The engine assembly according to claim 16, wherein the at least one actuating device further includes a pressure box arranged such that the pressure box displaces the lever against the spring mechanism when in an actuated state.

19. The engine assembly according to claim 18, wherein an outer circumference of the coupling wheel is structured complementary to the circumferential channel.

20. The engine assembly according to claim 19, wherein the first driver plate and the pulley are structured integrally.

* * * * *